United States Patent Office 3,265,033
Patented August 9, 1966

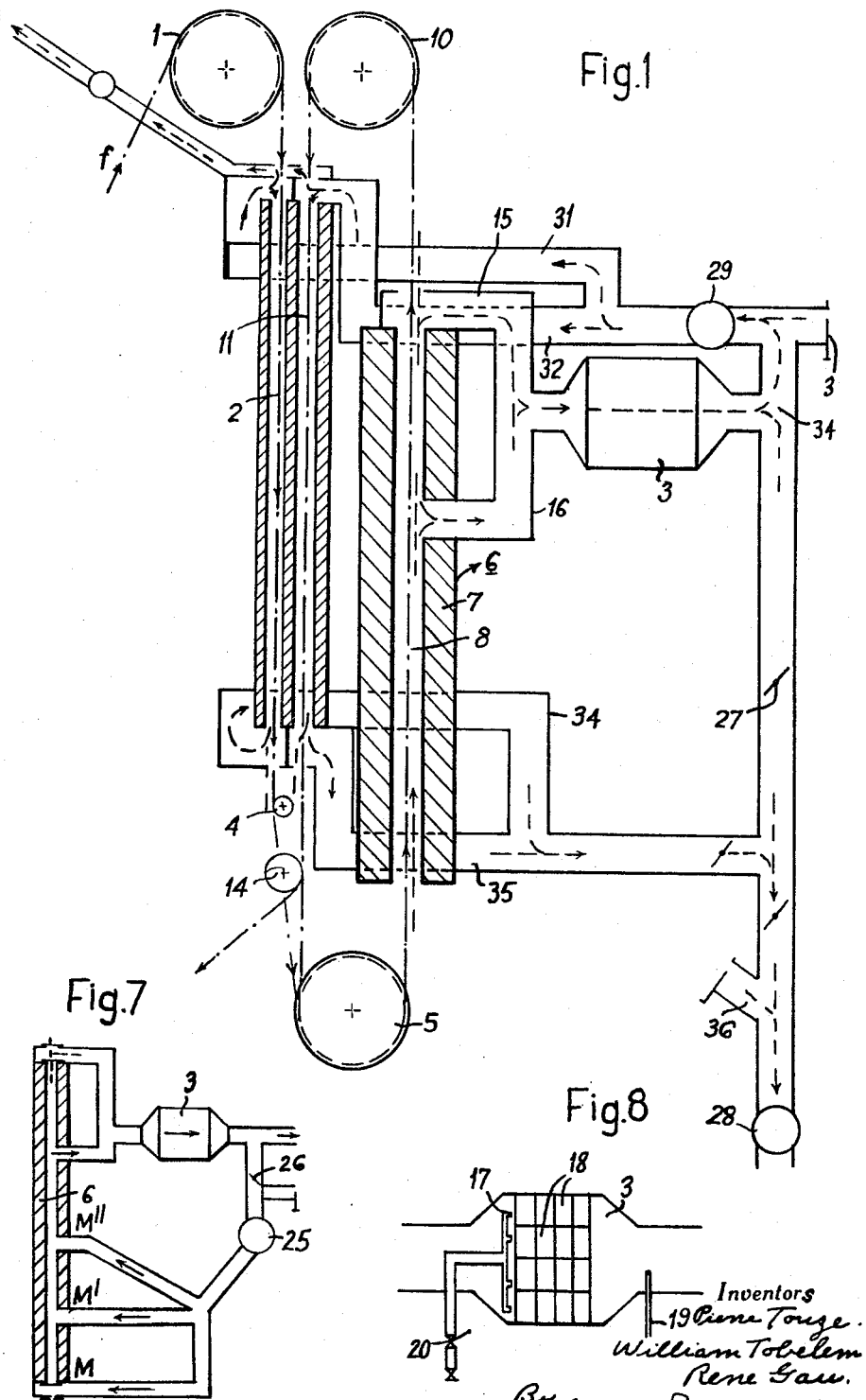

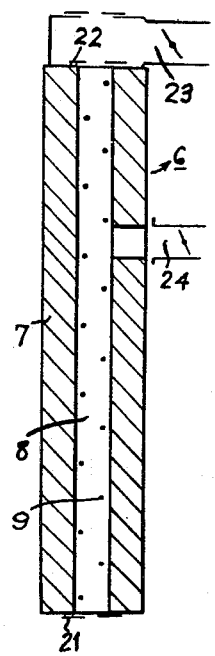
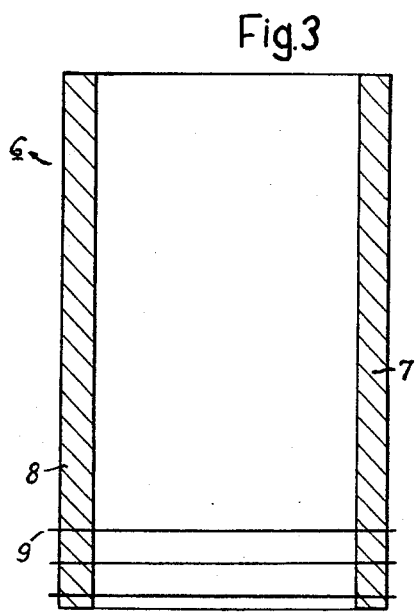
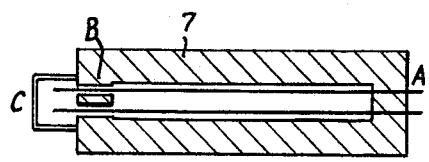
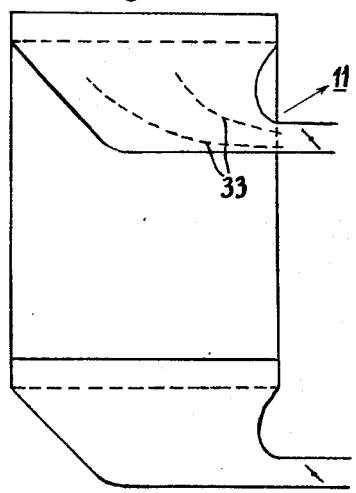
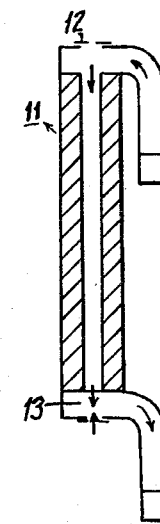

3,265,033
WIRE ENAMELLING FURNACES
Pierre Touze, William Tobelem, and Rene Gau, Reims, France, assignors to Compagnie Francaise Thomson-Houston, Paris, France, a French body corporate
Filed Oct. 6, 1961, Ser. No. 143,452
Claims priority, application France, Oct. 13, 1960, 841,059
2 Claims. (Cl. 118—61)

This invention relates to a process of and apparatus for enamelling wires. Broadly speaking, a wire-enamelling process involves first coating the wire with a solution of a selected enamel-forming polymerizable resin in a suitable volatile solvent, then passing the coated wire through a treating chamber in which predetermined temperature and other conditions are maintained for evaporating the solvent and baking or polymerizing the resin to provide the desired final coating of enamel on the wire.

In the continuous wire-enamelling systems heretofore used, the solvent evaporation and polymerization steps were generally carried out in a common treating zone, or at any rate in different zones or portions of a common treating chamber, so that there was no way of maintaining radically different thermal and other conditions (including chemical atmosphere and/or pressure conditions) during the solvent evaporation step and the polymerization or baking step respectively. The applicants' investigations, however, have demonstrated that it would be highly desirable, for reasons to be outlined hereinbelow, to perform the two operations of solvent-evaporation and resin polymerization under markedly different conditions and hence in treating zones completely separate from one another. This, as will be shown, makes it possible inter alia to increase the linear feed velocity through the apparatus above the velocities heretofore deemed practicable while securing equivalent if not better results than with the lower velocities previously used.

It is, therefore, an object of this invention to improve the production capacity and efficiency of wire enamelling systems. An object is to separate completely the solvent-evaporating and resin-polymerizing steps in a wire-enamelling process so as to permit of maintaining radically different sets of conditions in regard to each of said steps, thereby optimizing the conditions prevailing in each step independently of the conditions prevailing in the other step. A further object is to reduce the space requirements in a wire enamelling oven or furnace in regard to the over-all length dimensions thereof. An object is to provide improved heat recovery means and controllable fluid circulation pattern in such a system. Further objects will appear.

Various solutions exit for increasing the efficiency of the enamelling furnace, all of which tend, while maintaining the qualities of the wire, towards the adoption of as high linear speeds as possible during the enamelling process, in order thus to increase production.

Now, a necessary condition if a coating of given characteristics is to be obtained on the wire is that a quantity of heat at least equal to a specified value should be yielded to the wire per unit length during the time of passage T thereof through the heated enclosure, of length L, or treating chamber. The linear speed of the wire is equal to L/T.

This speed can therefore be increased: (1) by increasing L; (2) by reducing T; (3) by combining these two actions.

Let us examine these three points; (1) The increasing of L is limited by the cost and space taken up by the installation and by the unsupported length of the wire between the guide pulleys at the upper and lower ends of the chamber; (2) The reducing of T can be obtained by increasing the quantity of heat transmitted to the varnish per time unit in each point of the chamber, either (a) solely by increasing the intensity of the sources of heat in the enclosure, or (b) by improving the sources of heat in order that they affect, in a uniform manner and at equal temperature, the entire thickness of the varnish, or (c) by combining the two preceding actions.

The adoption of Solution (a) involves the danger, even if the temperature created inside the coat of varnish is low, of an abrupt evaporation of the volatile solvents making for irregularities on the surface of the varnish which would prejudice the remaining operations and the quality of the enamel.

Solution (b) can only be accomplished by combining two methods of heating, that is, the convection method which primarily affects the surface and the radiation method which penetrates the varnish covering the wire before and after reflection on its polished surface.

An increase in convection heating calls for forced ventilation. Increased radiation is achieved in conventional systems by means of a more intense source of heat, therefore, by increasing the temperature of the chamber is discussed in (a).

In the end one is led to Solution (c) which is frequently used but which presents the following drawbacks:

(1) Solvent evaporation proceeds under conditions which are not necessarily the most suitable for this auxiliary operation.
(2) Baking of the varnish, that is to say, the polymerisation of the resins proceeds in a chamber containing vapours of volatile organic solvents which may be prejudicial to this operation and which, being combustile, may ignite or explode in the chamber, in the presence of air.

The various studies undertaken by the applicant into these problems were not able to clearly indicate all the interactions, often harmful, between the complex phenomena accompanying the processes of the evaporation of the volatile solvents and the polymerisation of the resins. These studies did however show that the polymerization can occur substantially only when the varnish has been stripped sufficiently of its solvents, and that it can be completed only after thorough elimination of the latter.

The present invention provides a satisfactory solution to this problem. It consists essentially in carrying out the final polymerisation of the resins in a chamber separated from that in which the evaporation of the solvents took place.

The increase of L need, therefore, occur only in this evaporation chamber. That in which the polymerisation is carried out can, on the one hand, be of high temperature and short length and, on the other hand, can be situated parallel or obliquely in relation to the other, and side-by-side. The space occupied by the assembly is less than that taken up by the usual apparatus.

It is obvious that in the case of multi-wire furnaces, the partitioning of the evaporation and baking chambers can be provided for, in order that each one of the latter reach optimum temperature curves corresponding to the different varnishes used separately.

In accordance with the present invention the varnish of a wire entering into the polymerisation chamber has thus been rid of the major part of its volatile solvents, this preliminary operation having been carried to such a point that the possible residue of the solvents contained in the varnish no longer constitutes any disadvantage to the polymerisation operation itself.

An evaporation chamber, corresponding to the invention is planned to achieve the progressive elimination of the solvents under the best conditions of efficiency. In particular, it is heated by means which enable the temperature curve to be such that the evaporation of the solvents is completed almost before the wire leaves the chamber. As a result, since the varnish is already practically dry, the polymerisation of the resin in the part adjacent to the exit from the evaporation chamber, can already begin in this chamber. From the moment of entry into the polymerisation chamber proper, the temperature of the wire can be abruptly brought up to the optimum value required for polymerisation without risk of any of the disadvantages indicated above.

The heat content of the vapours of the solvents withdrawn from the evaporation chamber at judiciously placed points, may be recovered and used, in particular, for the total or partial heating of the various parts of the furnace. Such thermal recovery may be achieved either by conducting the vapours withdrawn directly to the points of use or by first submitting them to catalytic combustion.

The present invention, its technical features and its advantages, will be better understood upon reading the following description of an embodiment and upon examining the accompanying drawing. It should be understood that the embodiment described and illustrated in no way limits the scope of the invention and the applications to which it may be put. In the drawings:

FIGURE 1 shows a diagrammatic section of an installation comprising an enamelling furnace, in accordance with the present invention.

FIGURE 2 is a partial view illustrating the evaporation chamber of FIGURE 1, seen on the same plane as in that figure, but further showing electrical heating elements used therein as well as adjustable shutter means for controlling the gas circulation conditions;

FIGURE 3 shows the evaporation chamber as seen in the direction of the arrow III, FIGURE 2;

FIGURE 4 shows a horizontal cross section of the evaporation chamber of FIGURES 2 and 3, with some further details of the heating element mounting means;

FIGURE 5 shows the polymerization chamber of FIGURE 1 as seen on a vertical plane normal to that of that figure, i.e. in the direction of arrow V, FIGURE 6;

FIGURE 6 is a partial view illustrating the polymerization chamber of FIGURE 1, seen on the same plane as in that figure, including adjustable shutter means for controlling the gas circulation conditions therein;

FIGURE 7 is a partial view showing the assembly including the evaporation chamber and the catalytic vapor-combustion unit of FIGURE 1, including a modified system for the recovery of heat created by the combustion; and FIGURE 8 is a still schematic though more detailed view of the catalytic unit and its adjustment controls.

As shown (FIGURE 1) the cold-drawn wire $f$ which comes from a feed magazine, not shown, passes over a reversing device 1, and enters into the preheating oven chamber 2, where it undergoes a preparatory operation prior to enamelling. This preparation can simply clean the wire by heating, through circulating in the oven 2, the products of the combustion of the solvents in the catalytic block unit as later described. If at the same time it is necessary to anneal the wire, the preheating step is usually carried out in a neutral or reducing atmosphere heated by suitable means.

The wire then passes over a guide pulley 4, cools and winds around the pulley 5 where it is further cooled, if necessary by any appropriate known means (surrounding air, jets of air, exchangers operated by means of circulating water, vaporisation etc.). It then passes through a varnish applicator and through a drawplate (neither shown in FIGURE 1) before entering into the chamber of the autonomous evaporation oven indicated generally at 6.

This oven is composed of a body 7 (FIGURES 2, 3 and 4) built of heat resistant materials, which is thermally isolated and which defines an interior chamber of evaporation 8 (FIGURE 2) of narrow rectangular section.

Heating is effected by sheathed electrical resistances 9 sold to the trade under the Trademark "Calrod," (FIGURES 2, 3 and 4) which can be easily regulated in number and distribution by known methods.

In order to avoid deformation of the "Calrods" it is preferable that one of their extremities, for example extremity A (FIGURE 4) should be fixed, the other B extending freely through the wall 7 of the furnace. A lining C guarantees the thermal isolation and gas tightness.

Conjointly to heating by way of electric elements and by recycling of the products of the catalytic combustion of the solvents (as later described), infra-red radiation heat sources judiciously placed in this chamber, can be used.

Altogether, these devices make it possible to combine heating by radiation with heating by forced convection. A suitable distribution of temperatures is thus provided throughout, the length of the chamber of the furnace thereby making possible a simultaneous evaporation of the solvents on the surface and throughout the thickness of the varnish coating, each following its own particular evaporation curve.

Adjustment of the temperatures is effected in the embodiment described and illustrated, by regulating the energy consumed by the "Calrods" under control of one or more temperature probes, placed in the chamber. These probes may also serve to control, in the recognised manner, the gas circulation conditions as may be necessary to obtaining the required adjustment of temperatures by acting upon the speed of the fans and/or the setting of the various shutters situated in the conduits as later described.

At the exit of the chamber 8 of the evaporation oven 6, the layer of varnish must be cooled before passing around the pulley 10 (FIGURE 1). In the case of low diameter wire, cooling by surrounding air is generally sufficient. For larger wires appropriate more powerful methods are used.

If in an arrangement other than that of FIGURE 1, the polymerisation chamber is positioned as an extension of the evaporation chamber, this cooling will not be necessary since the wire no longer passes over a pulley. We shall, nevertheless, describe the arrangement of FIGURE 1, since it makes it possible to reduce the space requirements of the system and utilize the full length of the path of the wire.

After passing over pulley 10, the wire enters in to the polymerisation chamber which, in the embodiment illustrated (FIGURE 1) is arranged parallel to the evaporation oven 6 and side-by-side with the wire preheating oven 2, in such a way that ovens 6 and 2 share a common wall, thereby reducing the over-all longitudinal dimension of the assembly. It is obvious that, while respecting the principle of separation of the evaporation and polymerisation ovens in accordance with the invention, the said two ovens may be positioned in any appropriate relationship with respect to each other. Thus instead of being situated as here shown, as an extension of the evaporation oven, the polymerisation oven may be staggered parallel with regard to it or it may form an angle therewith.

Since the chamber of the polymerisation oven 11, is totally distinct from the chamber 8 of evaporation oven 6, the atmosphere within the two chambers can be completely different. It is thus possible to avoid, during the polymerisation operation, the presence of certain substances existing in the solvents and which are harmful to polymerisation. It is also possible to create any desired special atmosphere suitable to this operation.

In the example of FIGURE 1, the oven 11 is heated by the combustion products of the catalytic unit 3. It is clear that heating may be effected by any other means instead of or in addition to those shown.

The chamber of the polymerisation oven (FIGURES 5 and 6) is narrow and the thermal isolation of the walls must be more carefully executed than for the evaporation oven as the temperatures within it are higher.

It is advantageous to make the temperature curve in the polymerisation chamber quite flat by cancelling flue effect therein and maintaining relatively low pressure by means of the adjustable shutters 12 (FIGURE 6), regulating the depression in the bottom casing 13.

At the exit of the polymerisation chamber the wire is cooled by suitable means. It then winds on to pulley 5 (FIGURE 1), each of aluminium for example, which contributes to the cooling of the wire and which itself may be cooled. The wire passes through the varnish application for a second time and a further drawplate (not shown) thus completing several times the circuit which includes the evaporation and polymerisation chambers, according to the number of passes desired.

After its last passage through the polymerisation chamber, it is wound on to pulley 14 (FIGURE 1), in order to be guided to receiving means (not shown).

The shafts of the pulleys 1, 5 and 10 are preferably driven in such a way as to reduce the tensions on the wire along the length of its course.

The solvents evaporated in the evaporation oven 6 (FIGURE 1) are passed into the catalytic unit 3 with the air withdrawn from said oven, by means of conduit 15 connected to the exit of the latter and by another conduit 16 connected to a suitable point situated between the ends of the oven.

Additional heating for make-up and regulation purposes are provided by way of a suitable fuel gas inlet 17 (FIGURE 8) (coal gas, propane, butane, etc.) immediately ahead of the catalytic elements 18, of unit 3, or by electrical resistances. It is important to place the gas inlets very close to the catalytic elements in order to avoid the formation of an explosive mixture in the volume situated at the head of the unit.

A pyrometer probe 19, placed at the outlet of unit 3 controls the delivery of fuel gas or the heating current through the electrical resistances in order to maintain the temperature at the outlet of the unit constant.

If this temperature is too high without additional heating, a manual or automatically controllable air intake can be provided at the head of the unit 3 (FIGURE 1).

In the event of electric power failure or (d) breakdown of the fans circulating the gaseous fluids, an electro-valve 20 (FIGURE 8) cuts off the admission of the heating gas.

It is clear that if an electrically operated make-up heating system is used then the current would be cut off by means of a switch.

In event of the breakage of one of the wires being enameled, the enamelling of the other wires can continue and the lack of solvent vapors is automatically compensated by an increase in the make-up heat supply so that the treatment of the remaining wires can continue. In the event of all the wires breaking, circulatory conditions are still maintained, heat being supplied by the make-up heat source or sources and the temperatures are adequately maintained throughout the installation.

The course of the gases is shown diagrammatically on the figures illustrating the description by means of a broken line including arrows.

Thus it is seen that the withdrawal of vapors and air from the evaporation oven is effected at two points, thereby avoiding a concentration of the solvents in the part of the oven adjacent to its exit and preventing attainment of a dangerous explosive condition. By adjusting the shutters 21 and 22 (FIGURE 2), and controlling the depression in conduits 23 and 24, by means of the valves shown, it is even possible to inverse the direction of circulation of the gases in this part of the furnace.

At the outlet of the catalytic unit 3, part of the combustion products may be recycled to the evaporation oven 6 at one or more points M, M', M" (FIGURE 7) by means of a fan 25. An adjustable air intake is provided between the butterfly valve 26 and the inlet of fan 25. The particular pattern of gas flow distribution provided in the evaporation oven determines the form of the temperature curve for evaporation of the solvents.

Another part of the combustion products (indicated on FIGURE 1) divides beyond the catalytic unit 3 into two streams. One of these streams as adjusted by the shutter 27 is delivered to the intake of fan 28 which discharges the gases to the exterior. The other is taken up by the fan 29 with a possible addition of make-up air adjusted by shutter 30 in order to be returned to the preheating oven 2 and the polymerisation oven 11, to which it is distributed by conduits 31 and 32 and deflectors such as 33 (FIGURE 5).

From the outlet of these ovens the gases are taken up by conduits 34 and 35 and conveyed to the intake of the evacuation fan 28.

For a given pattern and rate of circulation of gaseous fluids, the speed of fan 29 (FIGURE 1) and that of fan 25 (FIGURE 7) are maintained at constant values. With the settings of the shutters at the extremities of the ovens and those of the different valves being held constant, the various flow rates obtaining at each point of the installation remain constant provided that the pressure drop through the system also remains constant. For this purpose the fan 28 (FIGURE 1) is rotated at constant speed. As the pressure conditions at the outlet of fan 28 may be variable in that the fan outlet may deliver into a large flue into which may also discharge, in parallel, the outlets from any number of other installations, an air intake 36 equipped with a valve pivoted on an eccentric horizontal axis carrying a counterweight, is provided for maintaining the gas outlet pressure constant.

Although only one embodiment of the invention has been shown and described, it is obvious that it is not limited to the specific forms which have been given merely as an example and that consequently all variations employing the same methods and fulfilling the same technical functions as those described above come within the framework of the present invention.

It is obvious that the invention is also applicable in the case where the volatile and combustible solvents carry the enamel-forming resin in suspension.

We claim:
1. In apparatus for coating wire comprising applicator means for applying a dispersion of a polymerizable substance in a volatile carrier to the wire, oven means including elongated preheat, evaporation and polymerization zones and means for continuously passing wire serially at least once through the applicator means to apply the dispersion to the wire, then through the preheat zone to preheat the wire and dispersion applied thereto, then through the evaporation zone to evaporate the carrier from the dispersion, and then through the polymerization zone to polymerize the substance remaining on the wire, the improvement comprising
the provision of said preheat, evaporation and polymerization zones in the form of separate chambers arranged in generally parallel laterally displaced relation with the polymerization and preheat chambers being in closely adjacent relation, including means isolating the chambers from one another,
means for maintaining different predetermined temperature conditions in the respective chambers,
means for withdrawing vapor of said carrier from spaced points of said evaporation chamber,
a catalytic combustion unit for burning said vapors, and means for controllably circulating combustion products from the combustion unit through said polymerization and preheat chambers.

2. Apparatus for coating wire comprising applicator means for applying a polymerizable substance dispersed in a volatile carrier to said wire;

means defining an elongated preheat chamber;

means defining an elongated evaporation chamber in generally parallel and laterally spaced relation to the preheat chamber;

means defining an elongated polymerization chamber in generally parallel and laterally closely adjacent relation to the preheat chamber;

means for separately and independently controlling the atmosphere and temperature conditions in each of said chambers;

pulley means mounted exteriorly of the chambers adjacent corresponding upper and lower ends thereof;

means for continuously and serially passing a wire at least once through the applicator means, through the preheat chamber in a first direction of feed, around said pulley means and through said evaporation chamber in a second and reverse direction of feed, and around said pulley means and through said polymerization chamber in said first direction of feed, means for withdrawing vapor from said evaporation chamber, a combustion unit for burning said vapors; and means for controllably circulating combustion products from said unit through said polymerization and preheat chambers.

References Cited by the Examiner

UNITED STATES PATENTS

| | | | |
|---|---|---|---|
| 1,857,987 | 5/1932 | Twiss et al. | |
| 1,947,548 | 2/1934 | Fruth et al. | 263—3 |
| 2,087,145 | 7/1937 | Harris | 263—3 |
| 2,448,835 | 9/1948 | Schefe. | |
| 2,521,044 | 9/1950 | Cooper et al. | 263—3 |
| 2,550,232 | 4/1951 | Donnell et al. | 117—49 |
| 2,921,778 | 1/1960 | Ruff | 263—3 |
| 3,106,386 | 10/1963 | Harris | 263—3 |

MURRAY KATZ, *Primary Examiner.*

F. L. MATTISON, JR., RICHARD D. NEVIUS, *Examiners.*

J. J. CAMBY, A. ROSENSTEIN, *Assistant Examiners.*